J. H. JACOBS.
JOINT AND LOCKING MEANS FOR STOVEPIPES.
APPLICATION FILED JULY 2, 1917.

1,301,565.

Patented Apr. 22, 1919.

Inventor
Joseph H. Jacobs.

UNITED STATES PATENT OFFICE.

JOSEPH H. JACOBS, OF DENVER, COLORADO.

JOINT AND LOCKING MEANS FOR STOVEPIPES.

1,301,565.     Specification of Letters Patent.      Patented Apr. 22, 1919.

Application filed July 2, 1917. Serial No. 178,103.

*To all whom it may concern:*

Be it known that I, JOSEPH H. JACOBS, a citizen of the United States, residing in the city and county of Denver and State of Colorado, have invented certain new and useful Improvements in Joints and Locking Means for Stovepipes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in stove pipe construction, and more particularly to the means for connecting the joints or sections of the pipe. My object is to provide improvements of the character indicated which shall increase the facilities with which the aforesaid functions may be accomplished.

Having briefly outlined my improvements I will proceed to describe the same in detail, reference being made to the accompanying drawing in which is illustrated an embodiment thereof. In this drawing.

The same reference characters indicate the same parts in all the views.

Figure 1:
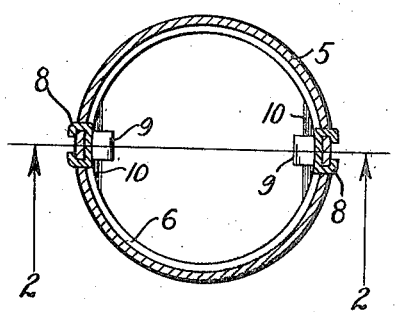
Figure 1 is a cross-section of the pipe illustrating my improved joint construction. This is a section taken on the line 1—1, Fig. 2 looking in the direction of the arrow.
Figure 3:
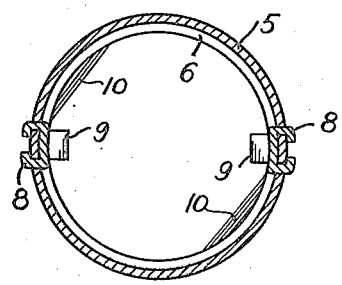
Fig. 3 is a cross section of the pipe illustrating the parts of the joint after they have been moved to a position to permit their disconnection.
Figure 2:
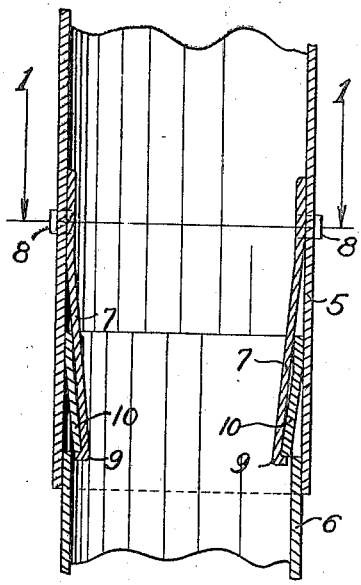
Fig. 2 is a longitudinal section taken through my improved joint on line 2—2, Fig. 1, the two sections being shown in the locked position.
Figure 4:
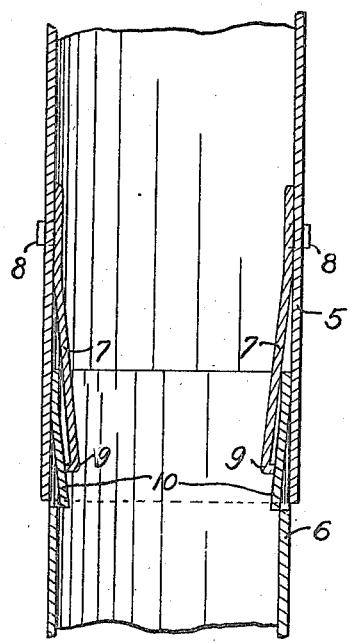
Fig. 4 is a longitudinal section illustrating the position of the parts as they are being moved into locked position.

Referring first to the means for connecting the stove pipe sections, let the numerals 5 and 6 designate the two sections of the pipe. The section 5 carries spring-actuated locking pawls 7 which consist of leaf springs having integral lips 8 which pass through openings formed in the pipe section, said lips being clenched or bent down on the outside of the section. Within the section these pawls extend considerably beyond the fastening lips 8, their free extremities being bent outwardly, as shown at 9, to engage inwardly bent parts 10 of the companion section 6. These parts 10 are formed by slitting the section 6 a short distance from its extremity, said slits extending away from the extremity, the two slits of each part being connected by a third slit which extends in a circumferential direction, the first named slits being parallel with the axis of the pipe. After the formation of these slits, the parts 10 are pressed inwardly and will maintain the position best shown in Figs. 2 and 4, whereby as the free end of the section 6 is inserted in the corresponding end of the section 5, the parts 10 will pass outside of the free extremities of the pawls 7, which will be forced inwardly during the inward movement of the section 6 until the free extremities 9 of the pawls pass the free extremities of the inwardly bent parts 10. The action of the pawls 7 and the parts 10 during the inward movement of the part 6 is well illustrated in Fig. 4. After the pipe sections are interlocked, as shown in Fig. 2, in order to disconnect them, it is only necessary to give one of the sections, as 6, a partial rotary movement within the part 5, said movement being of sufficient magnitude to move the inwardly bent parts 10 circumferentially beyond the hook-shaped extremities 9 of the pawls. This position is illustrated in Fig. 3. As soon as this is done, the two parts may be readily disconnected, as will be readily understood.

What I claim is:

Locking means for stove pipes comprising in combination with two telescoping pipe sections, an interiorly located pawl, one end of which is secured to one pipe section, while the other end is outwardly offset, the other section having a part bent inwardly forming an opening and arranged to interlock with the outwardly offset end of said pawl, said opening adapted to be exteriorly closed by the telescoping part of the other section.

In testimony whereof I affix my signature.

JOSEPH H. JACOBS.

Copies of this patent may be obtained for five cents each, by addressing the "Commissioner of Patents, Washington, D. C."